United States Patent [19]

Bourelier et al.

[11] Patent Number: 4,584,229

[45] Date of Patent: Apr. 22, 1986

[54] GLAZING ARTICLE

[75] Inventors: Claude Bourelier, Paris; Gérard Daudé, Villeneuve d'Ornon; Roger Orain, Garches, all of France

[73] Assignee: Saint-Gobain Vitrage, Courbevoie, France

[21] Appl. No.: 579,035

[22] Filed: Feb. 10, 1984

Related U.S. Application Data

[63] Continuation-in-part of Ser. No. 329,503, Dec. 10, 1981, abandoned.

[51] Int. Cl.⁴ .................. B32B 7/02; B32B 27/40; B60J 1/02
[52] U.S. Cl. .................. 428/216; 428/425.6; 428/423.3; 428/911; 296/84 R
[58] Field of Search .............. 428/213, 216, 423.1, 428/423.3, 425.5, 425.6, 911, 215; 296/84

[56] References Cited

U.S. PATENT DOCUMENTS

| 4,059,469 | 11/1977 | Mattimoe et al. | 428/215 |
| 4,139,674 | 2/1979 | Muller et al. | 428/425 |
| 4,232,080 | 11/1980 | Orain et al. | 428/215 |

*Primary Examiner*—George F. Lesmes
*Assistant Examiner*—Beverly K. Johnson
*Attorney, Agent, or Firm*—Oblon, Fisher, Spivak, McClelland & Maier

[57] ABSTRACT

Glazing comprising a support, an interlayer of a polyurethane-polyurea having energy absorbing properties, and an outer layer comprising a material having self-healing properties.

13 Claims, 12 Drawing Figures

ENERGY-ABSORBING LAYER ADDITIVES: ADHESION TIME DEPENDENCE OF LAMINATE ACCORDING TO THE PRESENT INVENTION

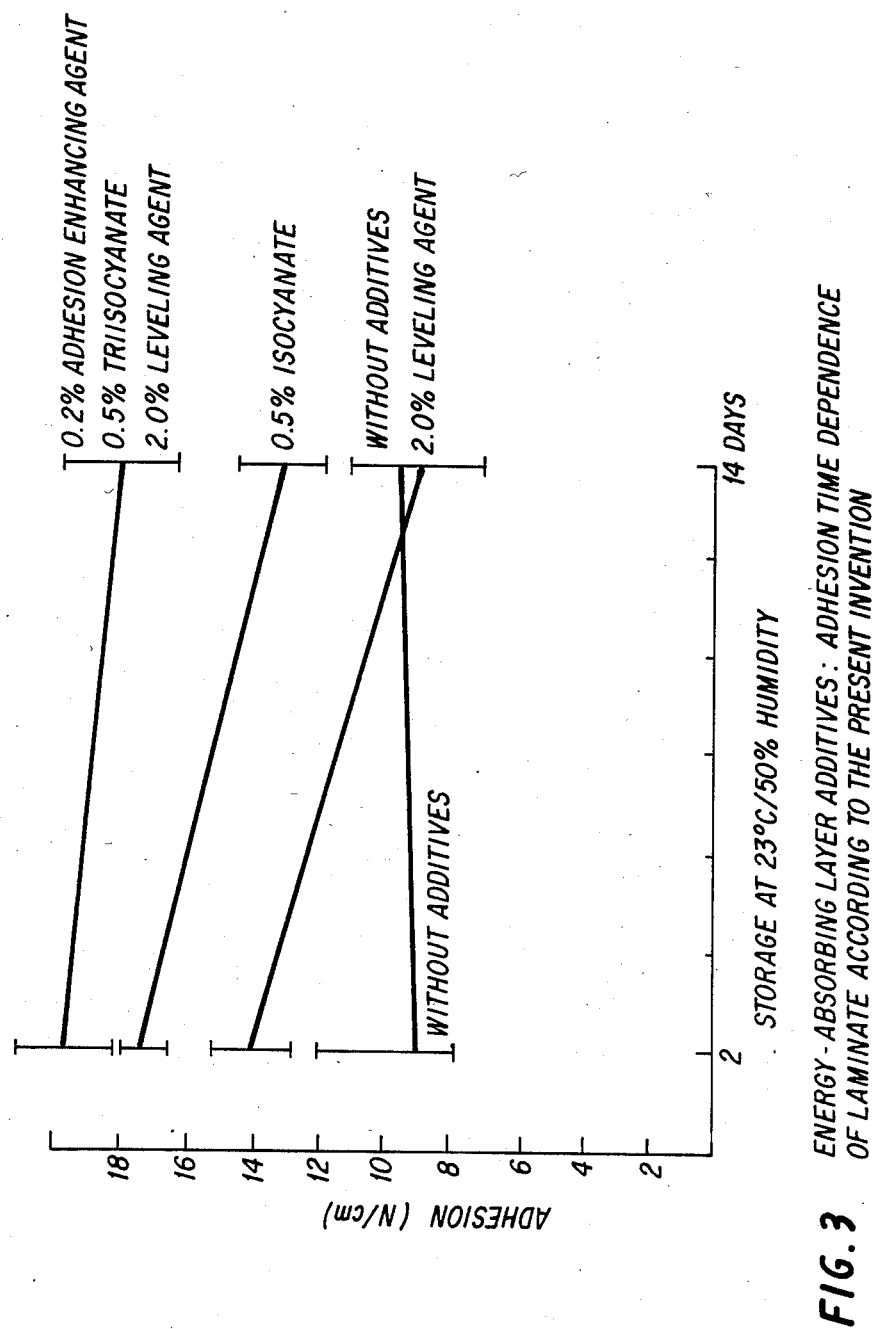

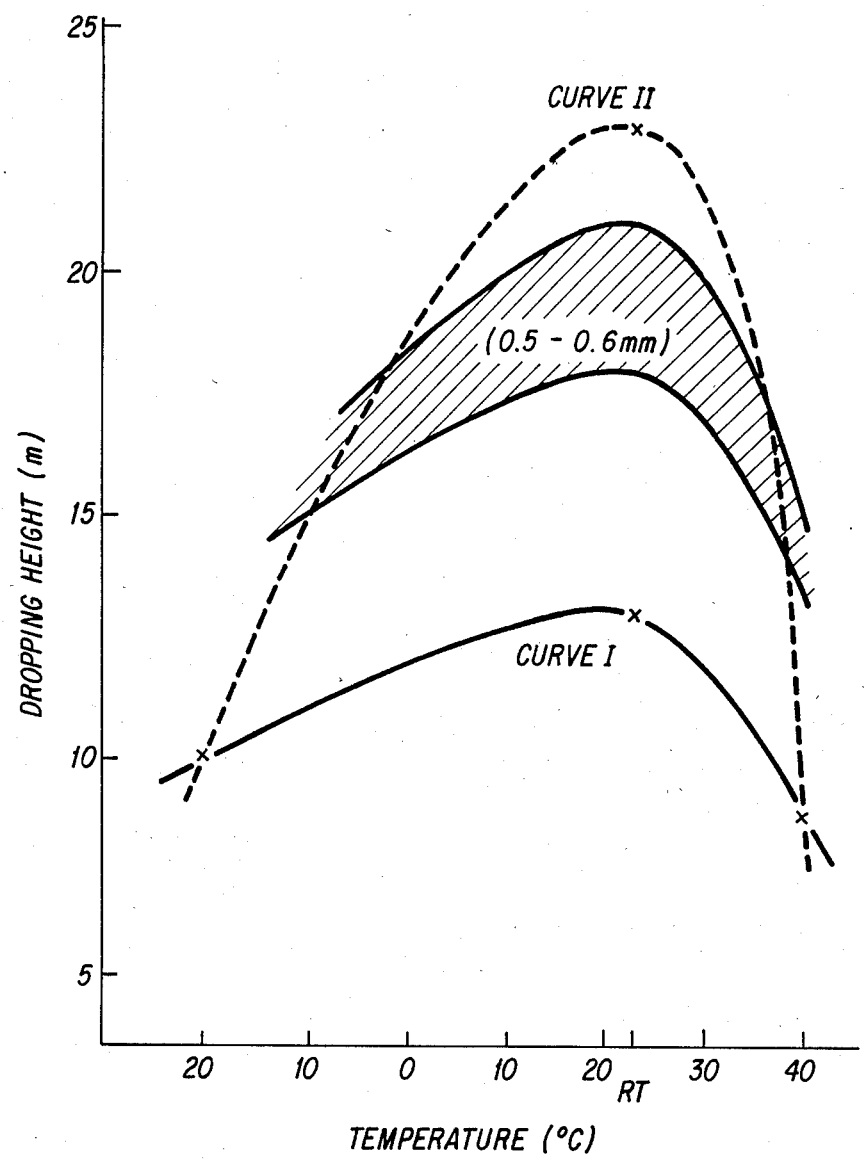
FIG. 4 PENETRATION LIMIT IN THE CASE OF THE DROPPING BALL (227g) AS A FUNCTION OF THE TEST TEMPERATURE

GLAZING ARTICLE

This is a continuation-in-part application of Ser. No. 329,503, filed Dec. 10, 1981, now abandoned.

FIELD OF THE INVENTION

This invention relates to the glazing field and particularly to safety glazings which can be used, for example, in vehicles, buildings and eye pieces. The invention particularly relates to laminated glazings comprising an interlayer of a material having energy absorbing properties and an outer layer of a material having self-healing properties.

REPORTED DEVELOPMENTS

There have been a number of reports describing improved safety glazing laminates. For example, French Pat. No. 2,134,255 (British Pat. No. 1,394,271) includes a description of a glazing laminate comprising a sheet of glass, an interlayer of plastic material, for example, plasticized poly(vinyl butyral), having energy absorbing properties and a protective coating, for example, a coating comprising an aliphatic polyurethane having self-healing properties. It has been observed that the plies of such laminates tend to separate after a period of time varying from a few days to several months. More specifically, a loss of adhesion between the inter layer and the glass surface to which it is adhered is experienced. In addition, a loss of optical quality is experienced. These problems are attributed essentially to the absorption of moisture in the layer of plasticized poly(vinyl butyral).

In an effort to avoid the aforementioned problems, it has been proposed (see British Pat. No. 1,394,271 and French Pat. No. 2,134,119) to place an intermediate layer which forms an anti-vapor barrier between the interlayer having energy absorbing properties and the self-healing layer. A glazing laminate having the desired properties is thus achieved, but it comprises at least four plies. When increasing the number of plies, the difficulties involved in adhering the various layers are increased. Additionally, the method of manufacture of such laminated glazings and, particularly, the assembly of the elements between them, becomes complicated and costly.

This invention relates to a safety glazing laminate which comprises a minimal number of laminae and which possesses properties which are required and/or desired in a number of applications.

SUMMARY OF THE INVENTION

The glazing laminate according to this invention comprises a layer of polyurethane-polyurea having energy absorbing properties and a self-healing layer. The self-healing layer is typically a plastic or resinous material, preferably a polyurethane having three-dimensional crosslinking.

One embodiment of the invention comprises a flexible, optically transparent two-ply sheet, one ply of which comprises an energy absorbing polyurethane-polyurea, and the other of which comprises a self-healing material. A sheet of such material can be used in making a laminate by adhering the polyurethane-polyurea side of the sheet to an appropriate substrate, for example, glass, plastic or other rigid material, to provide a laminate having an interlayer of energy absorbing polyurethane-polyurea and an outer surface of self-healing material. The adhesive qualities of the interlayer are such that the plies of the laminate resist delamination over a long period of time, even under conditions of high humidity and prolonged exposure to moisture.

Another aspect of this invention relates to a glazing laminate utilizing an energy absorbing layer having improved cohesive strength and other improved properties and comprising the product of a mixture of a preformed polyurethane polyurea and a polyisocyanate having more than two NCO groups.

This invention can be used effectively in a variety of applications, for example, in the field of lenses, safety windows, including vehicle windshields, and in bullet-resistant glazings.

BRIEF DESCRIPTION OF THE DRAWINGS

FIG. 3 is a graph of adhesion versus storage time at room temperature and 50% relative humidity.

FIG. 4 is a graph of impact-resistance versus temperature of the laminates according to the present invention and the prior art.

DETAILED DESCRIPTION OF THE INVENTION

Figure 1A:
FIGS. 1 and 2 comprise shadow projection photographs (designated by letters a through j) of laminates according to the present invention which have been subjected to the boiling water test, described below. The letter designations of the photographs correlate with the lettered entries in the chart presented below.

A preferred embodiment of the invention is a laminated glazing comprising a single rigid sheet of transparent material, for example, glass or plastic, which is covered with the polyurethane-polyurea, urethane-polyurea, which is itself covered with a self-healing material, for example, a plastic material preferably comprising a thermoset polyurethane, which is a soft material relative to other protective coatings which are scratch- and/or abrasion-resistant. In motor vehicle windshield applications, the sheet of rigid transparent material can have a thickness of about 0.2 to about 1 mm and, preferably, about 0.3 mm to about 0.6 mm, and the layer of self-healing material a thickness of about 0.2 to about 0.8 and, preferably about 0.3 mm. One advantage of the present invention is that smaller thicknesses of the energy absorbing interlayer can be used in such glazing structures than structures in which the interlayer is sandwiched between two rigid sheets of glass.

The polyurethane-polyurea for use as an adhesive and energy absorbing layer in embodiments of the present invention is a thermoplastic material, that is, a material which is capable of being softened by heat. Polyurethane-polyurea resins for use according to this invention are a known class of materials (for example, see U.S. Pat. No. 4,139,674). They can be formed from: a polyol component, for example, a polyetherdiol, a polyesterdiol, or a polycarbonatediol; a di-isocyanate component, the relation of the NCO isocyanate groups to the OH hydroxyl groups of the polyol component being greater than 1; and, at least one diamine capable of reacting with the excess isocyanate groups. The components can be chosen to obtain a transparent layer of good optical quality, and for this purpose, it is recommended that the polyurethane-polyurea contain about 1 to about 20% by weight of the urea groups.

The polyurethane-polyurea may be prepared according to the prepolymer process disclosed in U.S. Pat. No.

4,139,674, hereby incorporated by reference, that is, by reaction of the polyol component with the diisocyanate component to produce an NCO-prepolymer which may then be reacted with a chain extender, for example, the above-mentioned diamine.

The physical and bio-mechanical properties of the polyurethane-polyurea may be modified by adding mono- or polyfunctional reagents such as polyols, polyisocyanates, for example, triisocyanates, polyisocyanates and biurets of isocyanates, to crosslink a limited number of polymer chains. If a tri- or higher functional monomer is used in preparing the polymer, the use thereof should not be of a nature such that the polymer is crosslinked to the extent that it is thermoset, that is, a polymer which is not capable of softening when heated.

The properties of the polyurethane-polyurea layer may also be modified by combining additives with the preformed polyurethane-polyurea. Preferred additives include tri- or higher functional isocyanate compounds such as biurets and isocyanurates, which additives, like the tri- or higher functional monomer mentioned above, should not adversely affect the thermoplastic nature of the energy absorbing layer.

The tri- or higher functional isocyanate additives are polyisocyanates having more than two to about six isocyanate groups and are preferably the saturated aliphatic or cycloaliphatic polyisocyanate monomers and biurets prepared therefrom known in the art for use in the preparation of cross-linked polyurethanes and polyureas. The most preferred polyisocyanate additive is the biuret of 1,6-hexamethylene diisocyanate.

The preferred energy absorbing layer is prepared from a polymeric mixture comprising a preformed polyurethane-polyurea resin having about 1 to about 20 wt % of urea groups and a polyisocyanate additive having more than two NCO groups. The weight percent of polyisocyanate additive is about 0.5 to about 10 wt percent based on the weight of the preformed polyurethane urea resin. It is believed that the polyisocyanate additive is responsible for the formation of an intrapenetrating network of polymer chains which increases the cohesive strength and the moisture resistance of the energy absorbing layer. Although the chemical processes which occur during the formation of this intrapenetrating network are not precisely known, it is believed that the network may be formed as a result of the formation of urea, biuret and/or allophanate linkages by the reaction of the polyisocyanate additive with urethane and urea-hydrogen atoms present on the polyurethane-polyurea chain and/or by the reaction of the polyisocyanate additive with primary amines formed by the polyisocyanate and water. The resultant matrix of thermoplastic polymeric material comprises a unique energy absorbing layer exhibiting surprising properties including the ability to maintain optical clarity and cohesive integrity even when subjected to the rigors of the Boiling Test described below.

Other additives also can be added to the composition. Thus, to increase adhesive properties, adhesion promoters can be used, such as trialkoxysilanes preferably having an alkoxy radical of about 1 to about 4 carbon atoms, including glycidyloxypropyltrimethoxysilane, γ-aminopropyltrimethoxysilane, 3,4-epoxycyclohexylethyltrimethoxysilane, and aminoethyltrimethoxysilane. Although it is possible to incorporate certain substituents, such as carboxy groups in the polyol component, for example, carboxylic acids preferably having the formula

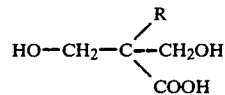

in which R represents a hydrogen atom or an alkyl group having about 1 to about 4 carbon atoms, the silane additive is preferred. Exemplary monomers for the polyol component include dimethylolacetic acid, α,α-dimethylolpropionic acid, and α,α-dimethylol-n-valeric acid. Examples of these acids and their uses are described, for example, in U.S. Pat. No. 4,139,674.

Flow enhancing agents (leveling agents) can be added, such as silicone oils, urea-formaldehyde resin solutions, phenolic resins and cellulosic esters, as well as pitching agents such as the polyester resins derived from phthalic acid. Ultraviolet light stabilizing agents may also be added, such as, benzophenones, salicylates, cyanoacrylates and benzotriazoles.

The additions of additives or other materials can occur during the dissolution of the polyurethane-polyurea in a casting solvent or they can even be carried out directly in an extruder, assuming the use of an extruder to form a film of the polyurethane-polyurea.

The use of the aforementioned polyfunctional isocyanate, in combination with an adhesive promoter, preferably an external adhesive promoter such as an alkoxysilane, and, depending on the case, with that of a flow enhancing or leveling agent, results in the formation of a laminated glazing which is the most preferred embodiment according to the present invention. This laminated glazing possesses excellent optical and adhesive qualities which are unaffected even after subjecting the glazing to very harsh conditions, such as, for example, submersion for two hours in boiling water.

In general, the reactants used in the preparation of the polyurethane-polyurea are chosen so that the molecular weight of the polyurethane-polyurea is greater than about 10,000, and preferably, about 20,000 to about 200,000.

The diisocyanate reactant may be, for example, an aliphatic, a cycloaliphatic or an aliphatic-aromatic (one insensitive to light) isocyanate or an isocyanate biuret. Exemplary difunctional aliphatic isocyanates are those such as: 1,6-hexanediisocyanate; 2,2,4-trimethyl-1,6-hexanediisocyanate; 2,4,4-trimethyl-1,6-hexanediisocyanate; 1,3-bis(isocyanatomethyl)benzene; bis(4-isocyanatocyclohexyl)methane; bis(3-methyl-4-isocyanatocyclohexyl)methane; 2,2-bis(3-methyl-4-isocyanatocyclohexyl)methane; 2,2-bis(4-isocyanatocyclohexyl) propane; 3-isocyanatomethyl-3,5,5-trimethylcyclohexylisocyanate; 1,4-butanediisocyanate; 1,2-hexanediisocyanate; 1,12-dodecanediisocyanate; 1,3-cyclobutanediisocyanate; 1,3-cyclohexanediisocyanate; and 1,4-cyclohexanediisocyanate; and mixtures thereof.

Exemplary classes of reactants are: hydroxyl polyetherdiol, polyesterdiol; polythioetherdiol; polyacetaldiol; polyesteramidediol having a molecular weight of about 300 to about 4000; polycaprolactone having a molecular weight of about 500 to about 2000; polybutadiene containing hydroxyl or carboxyl functions; short chain aliphatic diol having a molecular weight of about 50 to about 300; and a crosslinking agent, for example, a polyol with functionality greater than or equal to 3 having a molecular weight of about 800 to about 3000 or an amine with functionality greater than or equal to 3 having a molecular weight of about 200 to about 1000. Polyols produced by the reaction of polyfunctional alcohols and aliphatic diacids or cyclic ethers may be used, for example. Exemplary polyfunctional alcohols are: 1,2-ethanediol (ethyleneglycol); 1,2-propanediol; 1,3-propanediol; 1,4-butanediol; 2,2-dimethyl-1,3-propanediol (neopentylglycol); 1,6-hexanediol; 2-methyl-2,4-pentanediol; 3-methyl-2,4-pentanediol; 2-ethyl-1,3-hexanediol; 2,2,4-trimethyl- -1,3-pentanediol; diethyleneglycol; triethyleneglycol; polyethyleneglycols; dipropyleneglycol; tripropyleneglycol; polypropyleneglycols or 2,2-bis(hydroxymethyl)-1,1-propanol(trimethylolethane); 1,2,4-butanetriol; 1,2,6-hexanetriol; 2,2-bis(hydroxymethyl)-1,3-propanediol (pentaerythritol) and 1,2,3,4,5,6-hexanehexol (sorbitol); cyclohexanedimethanol.

Examples of aliphatic diacids (and anhydrides) that can be used in preparing polyols (polyesters) are: malonic, maleic, fumaric, succinic, adipic, suberic, azelaic, sebacic, phthalic, and isophthalic acids, phthalic, tetrahydrophthalic, hexahydrophthalic, tetrachlorophthalic, endomethylenetetrahydrophthalic, glutaric and maleic anhydrides.

Dihydroxypolycarbonates that can be used are obtainable, for example, by reactions of diols such as 1,3-propanediol, 1,4-butanediol, 1,6-hexanediol, 3-methylpentanediol-1,5-diethyleneglycol, triethylene glycol, and tetraethylene glycol, with diaryl carbonates such as diphenyl carbonate or phosgene.

Suitable dihydroxypolyethers are prepared, for example, by polymerization of epoxides such as ethylene oxide, propylene oxide, butylene oxide, tetrahydrofuran styrene oxide or epichlorohydrin in the presence of a catalyst, such as, $BF_3$, or by adding these epoxides, possibly in mixture or one-by-one, to the reactants having reactive hydrogen atoms such as water, alcohol or amines, for example, 1,2-ethanediol, 1,3-propanediol or 2,2'bis(4-hydroxyphenyl)propane and aniline.

NCO-prepolymers are generally prepared at a reaction temperature of about 80° to about 150° C. The reaction is followed by titration of the NCO groups. After the formation of the prepolymer, chain extender (for example, a diamine) is added to the reaction mixture either neat or in solution. The reaction can also be effected by using heated extruders. In general, a temperature of about 120° to about 300° C., and preferably, about 150° to about 250° C., is maintained during the chain extension reaction.

The preferred chain extenders are diamines, which preferably are aliphatic, cycloaliphatic, or mixed, aliphatic cycloaliphatic diamines having primary amino groups and a molecular weight of about 60 to about 300. Examples of such compounds are the following: ethylene diamine; tetramethylene diamine; hexamethylene diamine; 4,4'-diamino-3,3'-dimethyldicyclohexylmethane; and 1-amino-3,3,5-trimethyl-5-aminomethylcyclohexane (isophorondiamine). Particularly preferred diamines are 4,4'-diaminodicyclohexylmethane and isophorone diamine.

The polyurethane-polyurea can be extruded, or cast one or more times from a solution or dispersion in organic solvent or water. The preferred method for preparing the polyurethane-polyurea layer comprises the casting of a solution or dispersion containing about 1 to about 20 wt percent of the resin followed by evaporation of the solvent. When the polyisocyanate additive in an amount of about 0.05 to about 1.0 wt %, is added to the resin solution in organic solvents, the addition is made immediately prior to casting. In order to obtain a layer of suitable thickness to avoid the formation of optical imperfections, the solution or dispersion of polyurethane-polyurea is cast a number of times and after each casting the solvent is evaporated in a drying tunnel. The evaporation of the casting solvent may be conducted at room temperature at reduced pressure or more preferably at elevated temperatures of about 80 to about 120° C. and for a period of time sufficient to remove substantially all of the solvent so that no more than about 0.5 wt % solvent remains. During the evaporation process, the temperature of the film should not raise above about 100° C.

In its desired form, the surface of a film of the polyurethane-polyurea is substantially non-tacky at room temperature (about 15°-35° C.), that is, at temperatures likely to be encountered in a facility in which a film of polyurethane-polyurea is manufactured, stored and/or used in preparing a laminate. However, at elevated temperatures, the thermoplastic material is softened to the extent that when the surface of the film, or sheet incorporating the film is pressed onto a glass, plastic or other substrate, the thermoplastic material is capable of flowing and adhering to the substrate to an extent that it does not slip or slide on the surface of the substrate. While the polyurethane-polyurea film exhibits good adhesion to a glass surface, it also adheres well to other surfaces, including, for example, surfaces of plastic, examples of which include polycarbonates, polyacrylics, poly(vinylchloride) and polystyrene.

The thermoplastic polyurethane-polyurea can be formed on one of the plies of the laminate, that is, either on the support ply or on the self-healing ply. This material can also be formed on a support to which it does not strongly adhere in the form of a film which is detached from the support. The film can then be used in making the laminate.

The preferred self-healing material is a thermoset polyurethane having an excess of hydroxyl groups. Particularly preferred are the self-healing polyurethanes which are described, for example, in U.S. Pat. Nos. 4,232,080 and 3,979,548. This type of self-healing material has under normal temperature conditions a high capacity of elastic deformation, a low elasticity modulus (less than 2000 daN/cm$^2$ and preferably less than 1200 daN/cm$^2$) and an elongation to rupture of more than 60% with less than 2% plastic deformation, and preferably, an elongation to rupture of more than 100% with less than 1% plastic deformation. The preferred polyurethanes of this type are thermoset polyurethanes having an elasticity modulus of about 25 to 200 daN/cm$^2$ and an elongation of about 100 to 200% with less than 1% plastic deformation.

For use in windshield applications, the self-healing material advantageously has anti-lacerative properties. The preferred self-healing polyurethanes referred to above possess such properties.

Examples of monomers which are suitable for the preparation of self-healing themoset polyurethanes are, on the one hand, difunctional aliphatic isocyanates such as 1,6-hexanediisocyanate; 2,2,4-trimethyl-1-6-hexanediisocyanate; 2,4,4-trimethyl-1,6-hexanediisocyanate; 1,3-bis(isocyanato-methyl)benzene; bis(4-isocyanatocyclohexyl)methane; bis(3-methyl-4-isocyanatocyclohexyl)methane; 2,2-bis(4-isocyanatocyclohexyl)propane; and 3-isocyanatomethyl-3,4,4-trimethylcyclohexylisocyanate; as well as the biurets, isocyanurates and prepolymers of these compounds having a functionality of 3 or more; and, on the other hand, polyfunctional polyols, for example, polymeric polyols such as the polyesterpolyols and polyetherpolyols obtained by reaction of polyfunctional alcohols, particularly 1,2,3-propanetriol (glycerol); 2,2-bis(hydroxymethyl)-1-propanol(trimethylolethane); 2,2-bis-(hydroxymethyl)-1-butanol(trimethylolpropane); 1,2,4-butanetriol; 1,2,6-hexanetriol; 2,2-bis(hydroxymethyl)-1,3-propanediol (pentaerythritol); and 1,2,3,4,5,6-hexanehexol (sorbitol); with aliphatic diacids such as malonic acid, succinic acid, glutaric acid, adipic acid, suberic acid and sebacic acid or with cyclic ethers such as ethylene oxide, 1,2-propylene oxide, and tetrahydrofuran.

The molecular weight of the polymeric polyols is preferably about 250 to about 4000, and most preferably about 450 to about 2000. Mixtures of different polyisocyanates and polyolmonomers can be used. A particularly preferred thermoset polyurethane is the one described in U.S. Pat. No. 3,979,548, herein incorporated by reference.

A two-ply sheet comprising the polyurethane-polyurea and self-healing material can be manufactured in the following way.

To start, a first film is manufactured. It can be either the energy absorbing polyurethane-polyurea film or the film of self-healing material followed by the formation of the second film on the first film.

For example, a layer can initially be manufactured of thermoset polyurethane by flowing a mixture of the monomeric reactants on a casting support. After polymerization of the monomers and formation of a thermoset film with a thickness varying from about 0.2 to about 0.8 mm, a solution or dispersion containing the polyurethane-polyurea is deposited on the film and the solvent is evaporated. This casting may be repeated several times in order to obtain a suitable thickness. The resulting two-ply sheet is subsequently removed from the casting support. The sheets can be manipulated, for example, rolled, and stocked easily.

A film of polyurethane-polyurea can also be extruded onto a film of self-healing material. This procedure can also be carried out in reverse, that is, by first forming the film of polyurethane-polyurea.

In manufacturing a laminated glazing, the elements are assembled under pressure, for example, by pinching off between the rollers of a calenderer, and by heat curing. The bond between the plies can be improved by subjecting the laminated glazing to an autoclave cycle, for example, one hour at a temperature of about 100° to about 140° C. and under pressure of about 3 to about 15 bars.

Examples of laminated glazings using an interlayer of polyurethane-polyurea according to the present invention are described below.

EXAMPLE 1

A polyurethane-polyurea is prepared as follows. There are stirred in a receptacle for 12 hours at 60° C. in nitrogen 70 kg (31.2 moles) of a polyadipate of 1,4-butanediol having terminal OH groups and average molecular weight of about 2200, and 34.7 kg (156.3 moles) of isocyanato-3-isocyanatomethyl-3,3,5-trimethylcyclohexane (isophorone diisocyanate) (IDPI). Next, 7.5 kg (83.3 moles) of 1,4-butanediol and 1.4 kg (10.45 moles) of dimethylolpropionic acid are added and the contents are again stirred for two hours at 100° C. The resulting NCO-prepolymer contains 2.2% by weight of free NCO groups.

Through separate conduits, 600 g. (0.313 mole) per second of the NCO prepolymer and 26.6 g (0.313 mole) per second of isophoronediamine (IPDA) are continuously introduced into the feeding box of a heated double screw extruder. The relationship of the length to the diameter of the screws is about 40:1.

The temperature of the molten product is varied along the screws from about 120° to about 200° C. The molten product is quickly cooled in a bath of water, then dried before being granulated. The granulate is a colorless resin having the transparency of glass. The content of the —NH—CO—NH—groups is 2.46% by weight.

A thermoset polyurethane is prepared from the following degassed monomers:

(A) 1000 g of a polyether having a molecular weight of about 450, obtained by condensation of 1,2-propylene glycol with 2,2-bis (hydroxymethyl)-1-butanol and having a content of free hydroxyl groups of about 10.5 to about 12%; and (B) 1000 g of a biuret of 1,6-hexanediisocyanate having a content of free isocyanate groups of about 21 to about 24%.

Before mixing the monomers, 23 g of an antioxidant, namely 2,6-di(t-butyl)-4-methylphenol, and 0.5 g of a catalyst, namely dibutyltin dilaurate, are incorporated in the (A) monomer.

The above homogenous mixture of monomers are flowed onto a glass support coated with a release agent. The release agent can be, for example, a modified addition product of ethylene oxide corresponding to the general formula:

in which:

$R_1$ represents an alkyl group containing about 8 to about 18 carbon atoms or an alkyl-aryl group containing about 6 to about 12 carbon atoms in the alkyl chain, $R_2$ represents one of the following groups:

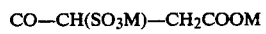

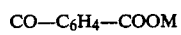

M being an alkali metal and
X represents one of the following groupings:

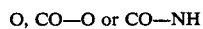

and
n is about 1 to about 100.

The monomers are polymerized under heat to obtain a solid thermoset film of polyurethane of about 0.3 mm thickness and having self-healing properties. A self-healing film is a material from which local impressions disappear spontaneously after a short period of time, on the order of a few seconds to a few minutes the speed of disappearance depending on the nature of the impression and on the temperature of the material.

Granules of the polyurethane-polyurea, prepared as described above, are then extruded with a two-screw extruding device. The extrusion is carried out at a mass temperature of about 200° C. A film about 0.3 mm thick is formed using a wide slotted nozzle and, when it reaches an elevated temperature on the order of 180° C., it is applied directly on the film of self-healing polyurethane described above. The assembly of the two films is effected by passing the films between rollers to form a two-ply sheet. The roller in contact with the film of polyurethane-polyurea is chilled and, depending on circumstances, has a surface structured to give either a granulated or smooth surface to the film of polyurethane-polyurea.

Laminates of 30 cm × 30 cm are prepared. They comprise a 2.5 mm thick plate of glass to which is adhered the aforementioned two-ply sheet comprising a 0.3 mm thick film of polyurethane-polyurea, and a 0.3 mm thick self-healing film of thermoset polyurethane. The polyurethane-polyurea functions as an adhesive and an energy absorbing material in the laminate.

EXAMPLE 2

The process described in Example 1 is followed except that a two-ply sheet of the energy-absorbing/adhesive material and self-healing material is not first manufactured. In this example, the three elements constituting the laminated glazing, after eventual cutting, are assembled simultaneously in a single calendering operation, followed by, depending on circumstances, an autoclave cycle.

EXAMPLE 3

The process described in Example 1 is followed except that a two-ply sheet is not prepared. Instead, the following process is used.

A first sheet of glass and a film of polyurethane-polyurea are assembled preliminarily. During assembly, a form, such as a second sheet of glass, coated with a release agent is placed on the side of the polyurethane-polyurea film opposite the side in contact with the first sheet of glass. The elements are adhered to each other utilizing pressure, after which the second sheet of glass is removed. A film of self-healing polyurethane is then placed on the exposed surface of the film of polyurethane-polyurea and formation of the laminate is completed by calendering and then an autoclave cycle.

EXAMPLE 4

A solution of a polyurethane-polyurea resin, as described in Example 1, is prepared by dissolving the resin in a mixture of three solvents of equal quantity, namely, one part tetrahydrofuran, one part xylene, and one part methylethylacetone. The solution contains 10% by weight of resin. To the solution are added 2% by weight of a leveling agent (made from a solution of 1% by weight silicone oil in xylol), 0.2% by weight of an adhesion promoter, namely, glycidoxypropyltrimethoxysilane, and 0.5% by weight of a triisocyanate, namely, a biuret of 1,6-hexanediisocyanate having a content of free isocyanate groups of about 21 to 24%.

The resulting solution is flowed onto a film of self-healing polyurethane according to the process described in Example 1. Several successive castings, with evaporation of the solvents between each casting, are generally necessary to form a layer of about 0.3 mm thick.

A two-ply sheet which is formed is assembled with a glass support as in Example 1.

EXAMPLE 5

A polyurethane-polyurea is prepared in the following manner:

One hundred fifty-three g (0.09 mole) of an adipic acid polyester, 1,6-hexanediol and neopentylglycol are dehydrated for 30 minutes at 120° C. under vacuo. Next, 1.34 g (0.01 mole) of dimethylolpropionic acid are added to the molten product, and, after suitable mixing, 66.6 g (0.3 mole) of isophorone diisocyaafter (IPDI) are added. The aggregate is agitated for three hours at 90° C. in nitrogen. The content of free NCO groups in the resulting prepolymer is 7.84%.

Six hundred g of methylene chloride are then added to the prepolymer. The stirred mixture is left to cool to room temperature under nitrogen, and during a period of 30 minutes, a solution comprised of 34 g (0.2 mole) of isophoronediamine (IPDA) in 320 parts of methylene chloride and 80 parts of methanol is added dropwise.

A colorless, transparent solution is obtained. (The content of the —NH—CO—NH— groups in the dry resin is 9.1%.) As in Example 4, the solution is flowed onto a film of self-healing polyurethane, and the two-ply sheet obtained is assembled with a glass support.

EXAMPLE 6

Added to the solution described in Example 5 are 2% by weight of a leveling agent (a solution of 1% by weight of silicone oil in xylol), 0.2% by weight of glycidoxypropyltrimethoxysilane and 0.5% by weight of a biuret of 1,6-hexanediisocyanate having a content of free isocyanate groups of about 21 to about 24%.

As in Examples 4 and 5, the solution is flowed onto the surface of a film of a self-healing polyurethane, and the resulting two-ply sheet which is obtained is assembled with a glass support.

EXAMPLE 7

A polyurethane-polyurea solution is prepared as follows.

Two hundred g (0.1 mole) of a polyester of adipic acid and ethyleneglycol are dehydrated for 30 minutes at 120° C. in vacuo. IPDI in an amount of 44.4 g (0.2 mole) is then added at one time. The mixture is agitated for 30 minutes at 120° C. in nitrogen. The prepolymer obtained has an NCO index of about 3.28%.

Six hundred g of toluene are then added to the prepolymer. The stirred mixture is left to cool to room temperature under nitrogen and during a 30 minute period, a solution comprised of 17 g (0.1 mole) of IPDA in 370 g of toluene and 410 g of isopropanol is added dropwise. (The content of the —NH—CO—NH— groups in the dry resin is 4.44%.) A leveling agent, a silane and a triisocyanate, as described in Example 6, are added to the resulting solution.

The resulting solution is flowed onto the surface of a film of self-healing polyurethane and the two-ply sheet which is obtained is assembled with a glass support.

EXAMPLE 8

A polyurethane-polyurea is prepared as follows. One hundred seventy g (0.1 mole) of the polyester of Example 5 are dehydrated for 30 minutes at 120° C. in vacuo (chasm of a water-jet pump). IPDI in an amount of 44.4 g (0.2 mole) are then added at one time. The mixture is stirred for 30 minutes at 120° C. under nitrogen. The prepolymer obtained has an NCO index of 3.98%.

Six hundred g of toluene are then added to the prepolymer. The stirred mixture is left to cool to room temperature under nitrogen, and, during a 30 minute period, a solution comprised of 17 g (0.1 mole) of IPDA in 210 g of toluene and 340 g of isopropanol is added dropwise. (The content of the —NH—CO—NH— groups in the dry resin is 4.01%.) A leveling agent, a silane and a triisocyanate, as described in Example 6, are added to the solution.

The solution is flowed onto the surface of a film of self-healing polyurethane and the two-ply sheet is assembled with a glass support.

The laminated glazings described in Examples 1 to 8 all have the optical quality necessary for use in automobile safety windows.

The laminates according to the present invention may be evaluated according to the standard tests set forth by the American Standards Association, in American Standard Safety Code for Safety Glazing Materials for Glazing Motor Vehicles Operating on Land Highways, (Revision Z26.1-1966). Laminates according to the present invention have been subjected to the Humidity Test (Test No. 3), the Boil Test (Test No. 4) and the Bake Test (Test No. 5), reproduced below.

Humidity, Test No. 3

5.3.1 Purpose of Test

The purpose of this test is to determine whether the safety glass will successfully withstand the effect of moisture in the atmosphere over an extended period of time.

5.3.2 Procedure

Three 12×12-inch flat specimens, as submitted, shall be kept for 2 weeks in a closed container over water. The temperature of the air in the container shall be maintained within the limits of 120° and 130° F. (These conditions give a relative humidity of about 100 percent.)

5.3.3 Interpretation of Results

No separation of materials shall develop, except for occasional small spots, no one of which shall extend inward from the adjacent edge of the specimen to to a depth of more than ¼ inch.

Boil, Test No. 4 (this test is not applicable to multiple glazed units.)

5.4.1 Purpose of Test

The purpose of this test is to determine whether the safety glass will successfully withstand exposure to tropical temperatures over an extended period of time.

5.4.2 Procedure

Three 12×12-inch flat specimens, as submitted, shall be immersed, vertically on edge, in water at 150° F. for 3 minutes and then quickly transferred to and similarly immersed in boiling water. The specimens shall be kept in the boiling water for 2 hours and then removed.

5.4.3 Interpretation of Results

The glass itself may crack in this test, but no bubbles or other defects shall develop more than ½ inch from the outer edge of the specimen or from any cracks that may develop. Any specimen in which the glass cracks to an extent confusing the results shall be discarded without prejudice and another specimen shall be tested in its stead.

Bake, Test No. 5 (Multiple Glazed Unit, Only)

5.5.1 Purpose of Test

The purpose of this test is to determine whether the multiple glazed structure will successfully withstand exposure to tropical temperatures over an extended period of time.

5.5.2 Procedure

The 12×12-inch flat specimens of multiple glazed unit after irradiation as specified in Test No. 1 through 5.1.2 shall be heated to 212° F. in an oven for 2 hours. If the structure having an air or gas layer between layers of glass is hermetically sealed, the seal must be vented.

5.5.3 Interpretation of Results

The glass itself may crack in this test, but no bubbles or other defects shall develop more than ½ inch from the outer edge of the specimen or from any cracks that may develop. Any specimen in which the glass cracks to an extent confusing the results shall be discarded without prejudice and another specimen shall be tested in its stead.

The adhesive strength of the laminates of the present invention may be measured by the 90 degree angle peel test described in NASA Tech Brief 65-10173. A 5 cm wide strip of laminate is adhered to a pull bar and a separating force applied to the laminate at a 90° angle and adjusted to result in separation of the laminate at a rate of 5 cm/min. The adhesive force needed to separate the laminate is divided by 5 to result in a standard measurement in N per linear cm.

The following chart presents the results of the above tests conducted on the laminates according to the present invention and specifically compares the adhesive and optical properties of the laminate comprising an energy absorbing layer prepared according to Example 5, above, with the properties of a laminate including in the layer of Example 5 one or more additives. The energy absorbing polyurethane-polyurea layer of each of the laminates tested was prepared by casting a 10% solution of the resin in a solvent mixture of THF, methyl ethyl ketone and xylene onto the surface of the self-healing layer. The resulting sheet is laminated onto a glass substrate and stored at 23° C. at 50% relative humidity for 2 and 14 days and a measurement taken of the adhesion force existing between the energy absorbing layer and the glass substrate. After the 2 day and 14 day storage period the laminates were subjected to the ANSI tests described above.

The test results presented in the chart below may be interpreted as follows:

A test is "passed" when no defects such as bubbling or significant reduction in adhesion develop in the laminate;

When the laminate requires only little effort to separate the two ply layer from the glass substrate corresponding to about 2–3 N/cm peel strength, "slight adhesion" is indicated;

When the two ply layer separates from the glass substrate simply by handling the test specimen, "no adhesion" is indicated; and When the laminate has partially separated during the course of the test, "separation" is indicated.

All laminates passed the Bake Test.

Laminates comprising energy absorbing layers having either no additives or only 2% flow enhancing agent exhibited reduced adhesion under the conditions of the Humidity Test. All other laminates retained their adhesion properties in the Humidity Test.

The Boil Test caused bubble formation in the energy absorbing layer in all laminates except the laminates including the polyisocyanate additive in the polyurethane-polyurea layer.

RESULTS OF BOIL, BAKE, AND HUMIDITY TESTS

| | Energy Absorbing Layer Additive | Storage Time Prior to Test | Adhesion Measurement After Storage (N/CM) | Adhesion and Optical Defects After Test | | |
|---|---|---|---|---|---|---|
| | | | | Boil Test | Bake Test | Humidity Test |
| (a) | none | 2 days | 8.9 | intense bubble formation. | no defects | reduced adhesion to 2-3 N/cm |
| (b) | " | 14 days | 9.7 | layer separation | no defects | |
| (c) | +2% leveling agent | 2 days | 14.0 | intense bubble formation | no defects | no adhesion |
| (d) | +2% leveling agent | 14 days | 8.9 | bubble formation, no adhesion | no defects | no adhesion |
| (e) | +0.2% silane | 2 days | not measurable, film tears | intense bubble formation | no defects | no defects |
| (f) | +0.2% silane | 14 days | | | no defects | no defects |
| (g) | +0.5% biuret of hexamethylene diisocyanate | 2 days | 17.4 | reduced adhesion to 2-3 N/cm. | no defects | no defects |
| (h) | +0.5% biuret of hexamethylene diisocyanate | 14 days | 13.0 | reduced adhesion to 2-3 N/cm, layer separation | no defects | no defects |
| (i) | all three of above additives | 2 days | 19.6 | no defects | no defects | no defects |
| (j) | all three of above additives | 14 days | 17.6 | no defects | no defects | no defects |

FIG. 3 is a graphic representation of the adhesive properties of the laminates according to this invention when various additives are incorporated into the energy absorbing polyurethane-polyurea layer.

Figure 1C:
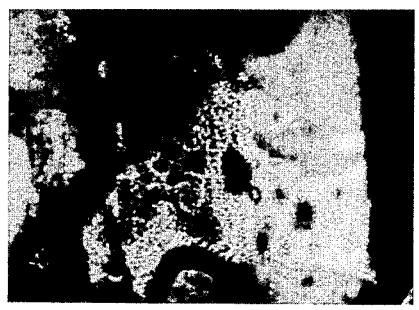
Figure 1E:
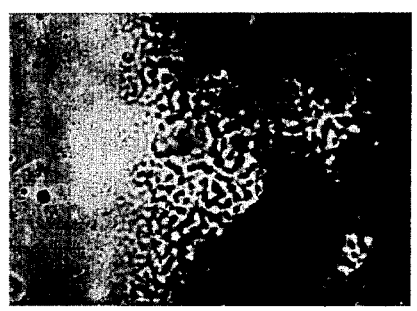
Figure 1G:
Figure 1I:
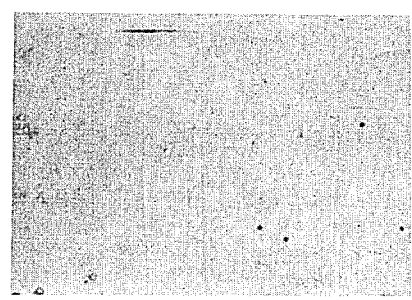
Figure 2B:
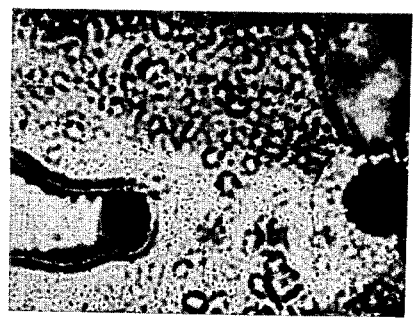
Figure 2D:
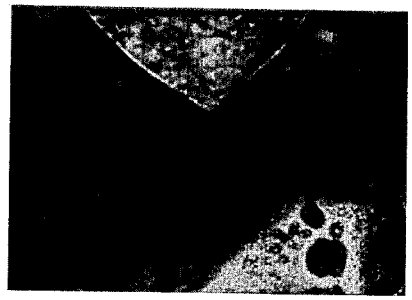
Figure 2F:
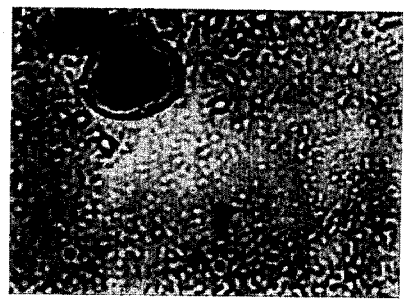
Figure 2H:
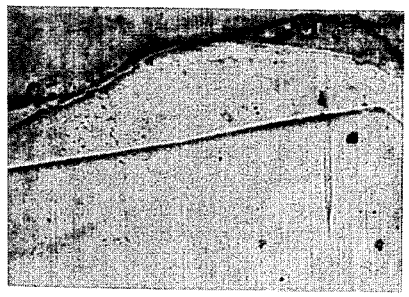
Figure 2J:
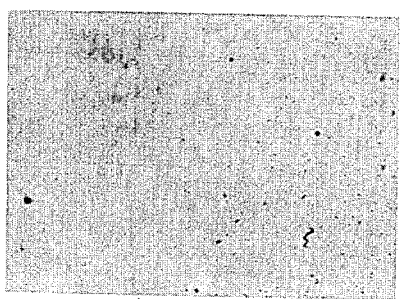

The above chart, the accompanying photographs of FIGS. 1, 2 and graph of FIG. 3 demonstrate clearly that the addition of the polyisocyanate to the polyurethane-polyurea resin increases the cohesive integrity of the laminated glazings to the extent that such glazings do not develop bubbles after being subjected to the industry standard Boil Test. For example, the laminated glazing of Example 5 develops bubbles after having been immersed for two hours in boiling water, whereas the identical laminate except for the polyisocyanaate additive is totally bubble-free after being subjected to identical test conditions. See, photographs a and b in contrast to photographs g through i. Furthermore, the laminate containing all three additives in the energy absorbing layer passed all three tests: the laminate preserved its cohesive integrity, did not develop bubbles, and retained its adhesive strength. See, photographs i and j.

The resistance to impact of laminates according to the present invention varies little with temperature, as can be seen from the FIG. 4 graphs which compare the variation of the impact-resistance of laminates of the present invention to that of a conventional windshield laminate formed from two glass sheets (each 3 mm thick) and an interlayer of poly(vinyl butyral) having a thickness of 0.76 mm. The temperature is indicated as the abscissa while the height of the fall of a ball, in meters, is indicated as the ordinate. The curves indicate the measurements at which the laminated glazings are penetrated. The curves marked with a solid line represent the shock-resistance of glazings according to the invention, curve I relating to a glazing having a 0.3 mm thick layer of polyurethane-polyurea, and the shaded area bound by the solid lines relating to a glazing having a 0.5-0.6 mm thick layer of polyurethane-polyurea. Curve II represents the shock-resistance of the conventional laminated glazing.

It is noted that the shock-resistance measurements at a temperature of about 20° C. are practically equivalent for glazings having an interlayer of about the same thickness. However, the shock-resistance of the conventional laminate drops sharply at low and high temperatures, while the shock-resistance of the laminate according to this invention retains its value under the same temperature variations to a much better degree. Among other things, this enables the use of thinner interlayers than with a conventional laminate.

The thickness of a laminate ply of the polyurethane-polyurea can vary, depending on the specific application in which it is used. An exemplary thickness range is about 0.01 to about 0.8 mm. It should be understood that the polyurethane-polyurea ply or film can have a greater thickness, for example, 1 mm or more. The energy absorbing properties of the polyurethane-polyurea are such that at a thickness within the aforementioned range of thickness, the energy absorbing properties can be equivalent or even better than those that are possessed by the industry standard used in a conventional windshield, that is, a sheet of poly(vinyl butyral) having a thickness of about 0.76 mm sandwiched between two glass sheets.

Examples of laminates including the polyurethane-polyurea and self-healing material include lenses, windows or transparencies for use in the optical, building, transportation and security industries, such as bullet-resistant windows or partitions, and side or lateral windows in motor vehicles, planes and trains. In addition, a two-ply sheet of polyurethane-polyurea and self-healing material can be laminated to a container, for example, glass and plastic bottles. The present invention can be used to particular advantage in producing a vehicle windshield comprising the polyurethane-polyurea sandwiched between an outer glass ply and an inner film or layer of self-healing material.

We claim:

1. A glazing laminate comprising a first plastic layer having energy absorbing properties and a second plastic layer comprising a thermoset polyurethane having anti-lacerative and self-healing properties, said first plastic layer formed from a reaction mixture including a thermoplastic polyurethane-polyurea containing about 1 to about 20% by weight of urea groups and at least one polyisocyanate having NCO functionality greater than two.

2. A glazing laminate according to claim 1, wherein said second plastic layer comprises a polyurethane formed by curing a liquid mixture containing (1) a polyglycol ether resulting from the condensation of propylene oxide with trimethylolpropane and containing about 10.5 to 12% by weight free hydroxyls together with (2) a biuret of 1,6-hexamethylene diisocyanate having about 21 to 22% by weight isocyanate groups, the weight of said biuret being between about 0.9 to 1.1 times the weight of said polyglycol ether.

3. A glazing laminate according to claim 2 wherein said polyurethane-polyurea is formed from the reaction of a polyurethane NCO-prepolymer and an organic diamine.

4. A glazing laminate according to claim 1 or 3 wherein said first plastic layer includes an alkoxy silane adhesion promoter.

5. A glazing laminate according to claim 4 wherein said polyurethane NCO-prepolymer is prepared from a reaction mixture including a dihydroxy carboxylic acid.

6. A glazing laminate according to claim 4 wherein said first plastic layer contains a leveling agent.

7. A glazing laminate according to claim 2 wherein said first plastic layer has a thickness of about 0.2 mm to about 1 mm and said second plastic layer has a thickness of about 0.2 mm to about 0.8 mm.

8. A glazing laminate according to claim 1 or 7 wherein said first plastic layer is affixed to a rigid transparent substrate.

9. A safety windshield comprising a glazing laminate according to claim 8.

10. A glazing laminate according to claim 8 wherein said rigid transparent substrate is glass, and wherein said first plastic layer includes an alkoxy silane adhesion promoter and a leveling agent.

11. A multi-ply flexible sheet, one ply of which comprises the product of a reaction mixture of a polyurethane-polyurea and a polyisocyanate having more than 2 NCO groups and which has energy absorbing properties and the other ply of which comprises a thermoset polyurethane having anti-lacerative and self-healing properties.

12. A safety glazing including a rigid plastic or glass substrate having adhered to a ply thereof the sheet of claim 11, said sheet being adhered to said ply by said polyurethane-polyurea reaction mixture product.

13. A safety glazing according to claim 12 in the form of a vehicle windshield and in which said substrate is glass.

* * * * *

UNITED STATES PATENT AND TRADEMARK OFFICE
CERTIFICATE OF CORRECTION

PATENT NO. : 4,584,229
DATED    : April 22, 1986
INVENTOR(S) : Bourelier, Claude et al.

It is certified that error appears in the above-identified patent and that said Letters Patent is hereby corrected as shown below:

-- The Priority Information has been omitted on the Letters Patent. It should read as following:

80 26270       FRANCE      December 11, 1980. --

Signed and Sealed this

Sixth Day of January, 1987

*Attest:*

DONALD J. QUIGG

*Attesting Officer*    *Commissioner of Patents and Trademarks*